United States Patent [19]
Tsyrganovich

[11] Patent Number: 6,002,449
[45] Date of Patent: Dec. 14, 1999

[54] INTEGRATED TELEVISION PROCESSOR

[75] Inventor: Anatoliy V. Tsyrganovich, San Jose, Calif.

[73] Assignee: Zilog, Inc., Campbell, Calif.

[21] Appl. No.: 08/950,722

[22] Filed: Oct. 15, 1997

[51] Int. Cl.[6] .................................................. H04N 5/44
[52] U.S. Cl. .......................................... 348/725; 348/569
[58] Field of Search ..................................... 348/571, 725, 348/569, 553, 500, 552

[56] References Cited

U.S. PATENT DOCUMENTS

| | | | |
|---|---|---|---|
| 4,953,027 | 8/1990 | Tong et al. ................................ | 348/569 |
| 4,962,427 | 10/1990 | Lunn et al. ............................... | 348/725 |
| 4,962,428 | 10/1990 | Tong et al. ................................ | 348/569 |
| 5,075,766 | 12/1991 | Sendelweck ............................. | 348/569 |
| 5,103,311 | 4/1992 | Sluijter et al. . | |
| 5,592,234 | 1/1997 | Gardner et al. .......................... | 348/553 |
| 5,737,035 | 4/1998 | Rotzoll ..................................... | 348/725 |
| 5,856,975 | 1/1999 | Rostoker et al. ........................ | 348/467 |

FOREIGN PATENT DOCUMENTS 7107330  4/1995  Japan .
7154285  6/1995  Japan .

OTHER PUBLICATIONS

Caldwell, M. et al.; "HDTV data carrier separation using a multiplexing filter"; *Proceedings of the IEEE Custom Integrated Circuits Conference 1993*; May 9–12, 1993; pp. 15.4.1–15.4.4.

Parrish, G. and B. Felts; "Digital video decoding"; *Proceedings of the IEEE Wescon/93 Conference*; Sep. 28–30, 1993; pp. 594–596.

*Primary Examiner*—Victor R. Kostak
*Attorney, Agent, or Firm*—Majestic, Parsons, Siebert & Hsue

[57] ABSTRACT

By forming a digital video processor and digital television controller on the same integrated circuit, a number of advantages in improved picture quality can be obtained. The length of the communication connections between these two elements can be reduced, thus reducing television picture distortion caused by electromagnetic interference. Additionally, the elements can be controlled by a single dot clock generator with a single phase locked loop circuit. Also, register banks can be used for intercommunication between the television controller and the video processor rather than the communication between two different ICs over a bus.

27 Claims, 3 Drawing Sheets

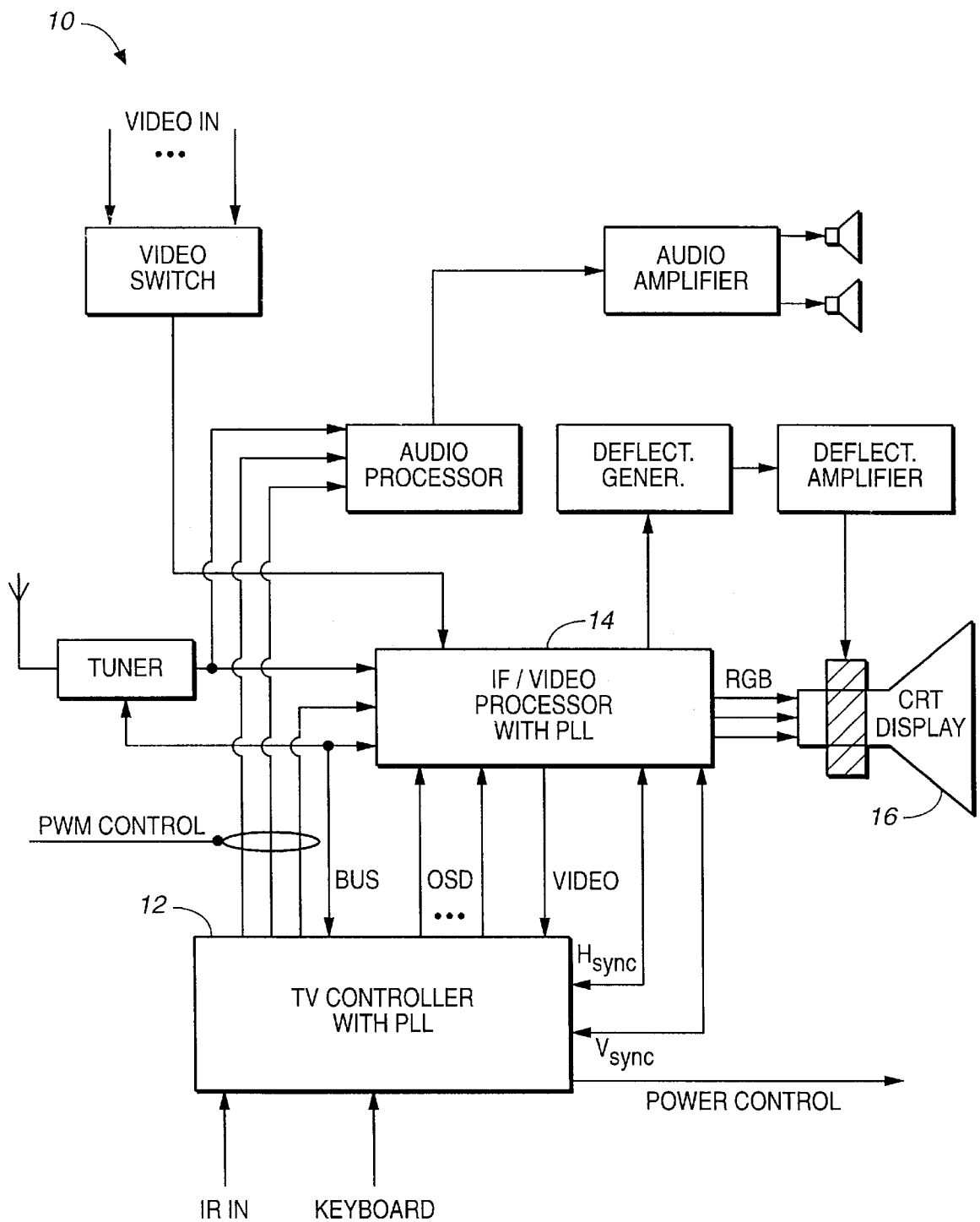
FIG._1
*(PRIOR ART)*

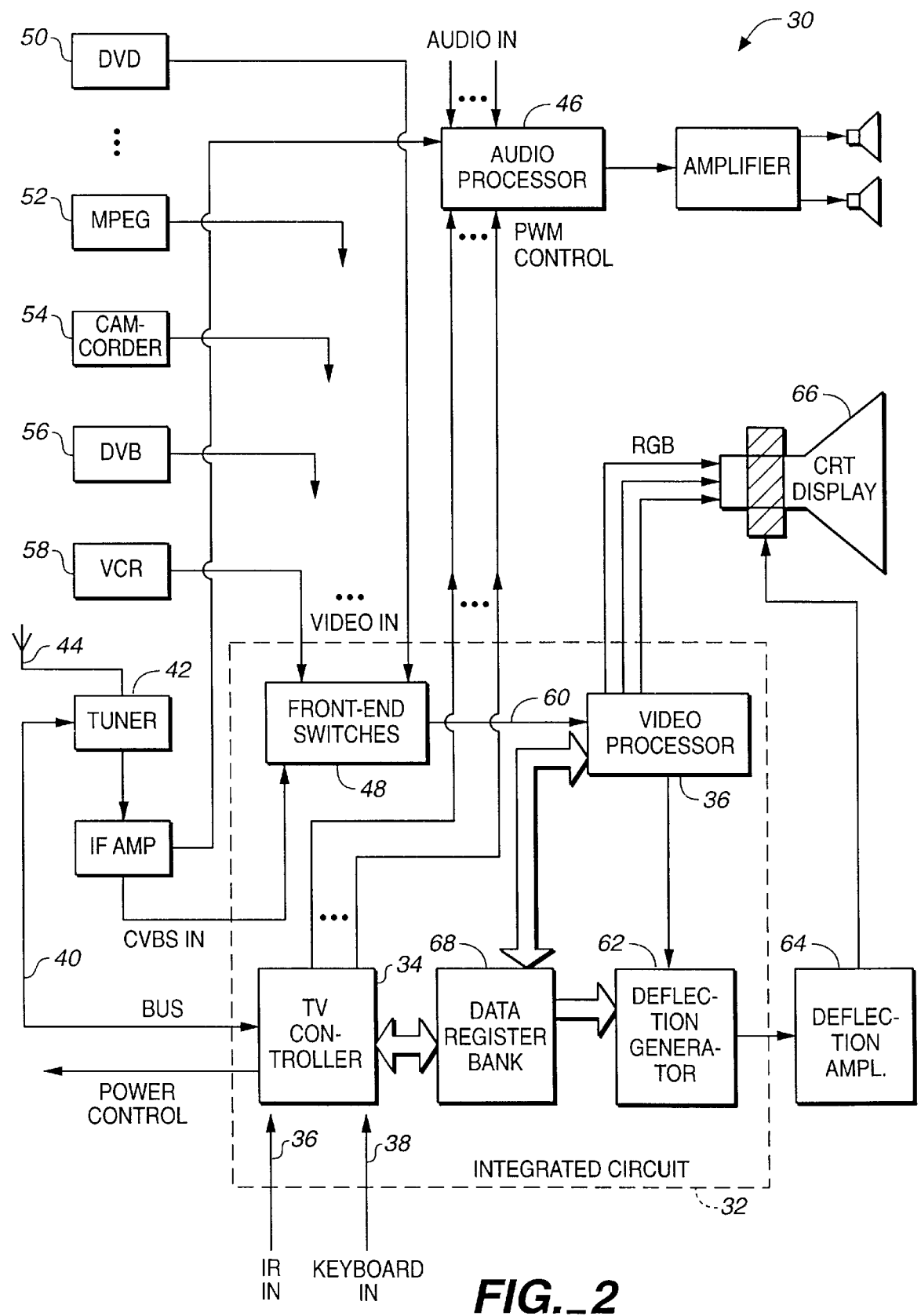
FIG._2

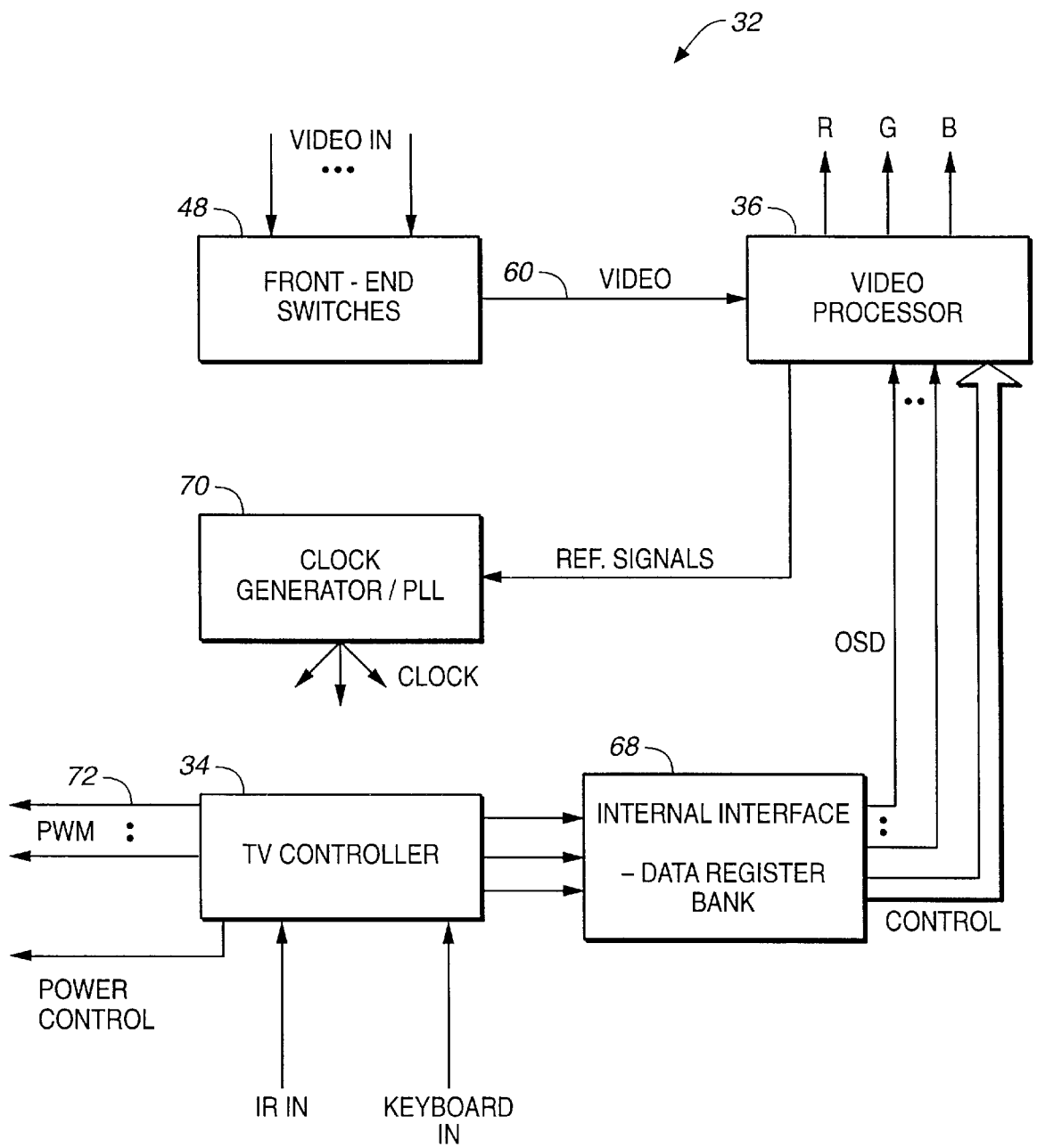
FIG._3

INTEGRATED TELEVISION PROCESSOR

BACKGROUND OF THE INVENTION

The present invention relates to television systems, especially in the architecture of television systems.

Contemporary television processors are complicated and multi-functional. They control the television tuner, video processor, audio processor, deflection parameters, power supply, and video input select. FIG. 1 is a diagram of a prior art television system. In a typical television system, television controllers are used. Television controllers receive input from the user and control other units in the television processor. Typically, the television controller is formed on an integrated circuit (IC). Additionally, a video processor 14 is formed on another integrated chip. The video processor converts a video signal to pixel data, which is sent to the display such as a CRT display 16.

There are disadvantages of having the video processor and the television controller on two different integrated chips. Long wire communication on television chassis with high frequency and sharp signals can cause a lot of electromagnetic interference (EMI) and picture distortions, such as jitter. For this reason, it is desired to have an improved television processor architecture that prevent these problems.

SUMMARY OF THE PRESENT INVENTION

By putting the television controller and the video processor together on one integrated circuit chip, the length of the communication links between these two elements is reduced. This can remove some of the problems of the prior art. Additionally, by using a single dot clock generator for both the video processor and the television controller, the picture quality can be improved. Prior systems had a dot clock generator with its own phase locked loop (PLL) circuit on both the video processor IC and the television controller IC. It is impractical to send the clock signal between integrated circuits so each IC would reconstruct a dot clock from the horizontal and vertical sync. Since the television controller and the video processor are synchronized by a single dot clock in the present system, this facilitates features such as picture-in-picture (PIP) and on-screen display (OSD).

Additionally, by using an internal interface between the television controller and the video processor that uses a bank of registers, the communication between the television controller and the video processor can be improved. The control data in the registers can be written into and read from by either the television controller and the video processor. This data can include the parameter controls. Examples of such data would be the contrast or sharpness parameters input by the user into the television controller and stored in the register banks of the internal interface where the data can be easily accessed by the video processor. The transfer of data in registers is facilitated since the television controller and video processor are on the same integrated circuit, and data need not be transferred in a bus between ICs.

BRIEF DESCRIPTION OF THE DRAWINGS

The above and other features and aspects of the present invention will become more apparent upon reading the following detailed description in conjunction with the accompanying drawings.

FIG. 1 is a diagram of a prior art television system.

FIG. 2 is a diagram of the television system of the present invention with the integrated circuit including the television controller and video processor shown in phantom.

FIG. 3 is a diagram of functional units of the integrated circuit including the television controller and video processor of the present invention.

DETAILED DESCRIPTION OF THE PREFERRED EMBODIMENT

FIG. 2 is a diagram of the television system 30 of the present invention showing the integrated circuit 32 with the television controller 34 and the video processor 36. Forming the television controller and video processor within the single integrated circuit 32 has the advantage that the connections between the units are shorter, and thus produce less electromagnetic interference.

The television controller unit 34 receives user input over lines 36 and 38. An infrared (IR) input such as that from a remote control can be received over line 36, and a keyboard input could be received over, for example, line 38. The television controller can be used to produce a power control on/off signal for the television set, as well as placing information on the bus 40 to control the television tuner 42. The bus 40 can be, for example, an I²C bus available from the Philips Corporation. The television controller 34 can instruct the tuner 42 to tune the signal from the antenna 44. The audio portion of the tuned signal is sent to the audio processor 46 and the video portion is sent to the front-end switch 48. The front-end switch 48 is preferably a portion of the integrated circuit, and can receive additional video input such as that from a digital videodisc (DVD) 50, a source of data encoded in the MPEG (moving pictures expert group) standard 52, a camcorder 54, a digital video broadcast (DVB) 56, or a videocassette recorder (VCR) 58. The front-end switch is controlled by the television controller 34 and sends a video signal on line 60 to the video processor 36. The video processor converts the video data on line 60 to a red/green/blue (RGB) signal for the CRT display, as well as controls the deflection generator 62 to send a signal to the circuitry 64, which produces the deflection amplitude. The CRT display 66 uses the RGB signal and the deflection signal to produce the video display. Also shown in this circuitry is the data register bank 68 of the internal interface. The data register bank stores the control information, such as the saturation and brightness controls, from the television controller 34 and holds it to be accessed by the video processor 36 as desired. As discussed above, storing the information in a data register accessible by both the television controller and the video processor has advantages over having separate ICs with the television controller and the video processor, and transferring data over a bus.

The use of a single dot clock generator with a phase locked loop circuit can be best seen in the functional diagram of FIG. 3. FIG. 3 is a diagram of the functional units of the integrated circuit of the present invention. The video processor 36 can send reference signals, such as the horizontal sync, to the clock generator phase lock loop system 70. The clock generator produces a dot clock which can be sent to the different elements, including the television controller 34 and the video processor 36. The television controller 34 is shown with the outgoing control line 72 sent to the audio processor (not shown). These control lines are sent as pulse-width-modulated information. Pulse-width-modulated data does not need to be sent to the video processor 36 because the data registers in the bank 68 can store the control data. The transfer data can include on-screen display (OSD) data, such as menu selection information or closed captioning.

Having a single clock generator 70 has a number of advantages. The clock signals will be synchronized, since they come from a single circuit. This means that the video signals from a first source, such as the OSD data from the television controller, can be accurately combined with the signals from another source, such as the video line 60. In a similar manner, picture-in-picture functions can be improved.

Various details of the implementation and method are merely illustrative of the invention. It will be understood that various changes in such details may be within the scope of the invention, which is to be limited only by the appended claims.

What is claimed is:

1. An integrated circuit including:
   a digital video processor for decoding a video signal and producing a pixel output;
   a digital television controller for receiving the user input and controlling the television channel selection; and
   an internal interface including registers for exchanging data between the digital video processor and the digital TV controller.

2. The integrated circuit of claim 1, wherein the television controller produces a power on/off signal.

3. The integrated circuit of claim 1, wherein the television controller produces an on-screen display.

4. The integrated circuit of claim 3, wherein the on-screen display information is sent through the internal interface to the video processor.

5. The integrated circuit of claim 1, wherein the television controller produces audio control signals.

6. The integrated circuit of claim 1, further comprising a single dot clock generator receiving a timing reference signal from the video processor and producing a dot clock for both the video processor and the TV controller.

7. The integrated circuit of claim 6, wherein the dot clock generator includes a phase locked loop circuit.

8. The integrated circuit of claim 6, wherein the dot clock generator includes horizontal sync pulses from the video processor as an input.

9. An integrated circuit including:
   a digital video processor for decoding a video signal and producing a pixel output;
   a digital television controller for receiving the user input and controlling the television channel selection; and
   an internal interface including registers for exchanging data between the digital video processor and the digital TV controller, further comprising a deflection signal generator connected to the registers.

10. The integrated circuit of claim 1, further comprising video input switches.

11. An integrated circuit including:
    a digital video processor for decoding a video signal and producing a pixel output;
    a digital TV controller for receiving the user input and controlling the television channel selection; and
    a single dot clock generator receiving a timing reference signal from the video processor and producing a dot clock for both the video processor and the television controller.

12. The integrated circuit of claim 11, wherein the dot clock generator includes a phase locked loop circuit.

13. The integrated circuit of claim 11, wherein the dot clock generator includes horizontal sync pulses from the video processor as an input.

14. The integrated circuit of claim 11, further comprising an internal interface including registers for exchanging data between the digital video processor and the digital television controller.

15. The integrated circuit of claim 11, wherein the television controller produces a power on/off signal.

16. The integrated circuit of claim 11, wherein the television controller produces an on-screen display.

17. The integrated circuit of claim 16, wherein the on-screen display information is sent through an internal interface to the video processor.

18. The integrated circuit of claim 11, wherein the television controller produces audio control signals.

19. A method of processing video data comprising:
    providing an integrated circuit including a digital video processor, a digital television controller, and an internal interface including registers;
    decoding a video signal and producing a pixel output in the digital video processor;
    receiving the user input and controlling the television channel selection in the digital television controller; and
    exchanging data between the digital video processor and the digital television controller by storing the data in the registers.

20. The method of claim 19, wherein the television controller produces an on-screen display information and the on-screen display information is sent through the internal interface to the video processor.

21. The method of claim 19, further comprising producing a single dot clock in a dot clock generator on the integrated circuit from a timing reference signal supplied by the video processor, the dot clock being supplied to both the video processor and the television controller.

22. A method of processing video data comprising:
    providing an integrated circuit including a digital video processor, a digital television controller, and a dot clock generator;
    decoding a video signal and producing a pixel output in the digital video processor;
    receiving the user input and controlling the television channel selection in the digital television controller; and
    producing a single dot clock in the dot clock generator from a timing reference signal supplied by the video processor, the dot clock being supplied to both the video processor and the television controller.

23. The method of claim 22, further comprising exchanging data between the digital video processor and the digital television controller by storing the data in registers of an internal interface on the integrated circuit.

24. The method of claim 22, wherein the dot clock generator uses a phase locked loop circuit to produce the dot clock.

25. The method of claim 22, wherein the dot clock generator uses horizontal sync pulses from the video processor as an input to produce the dot clock.

26. An integrated circuit including:
    a digital video processor for decoding a video signal and producing a pixel output;
    a digital television controller coupled through registers to said digital video processor for receiving the user input, generating on-screen display and controlling the television; and
    an internal interface based on synchronous registers for sending on-screen display and control data to said digital video processor.

27. A method of processing video data comprising:

providing an integrated circuit including a digital video processor, a digital television controller, and an internal interface on synchronous registers;

decoding a video signal and producing a pixel output in the digital video processor;

receiving the user input, generating on-screen display and controlling the television in the digital television controller, wherein the digital television controller is coupled through registers to said digital video processor; and sending on-screen display and control data to said digital video processor by storing the data in said synchronous registers.

* * * * *